Figure 1:
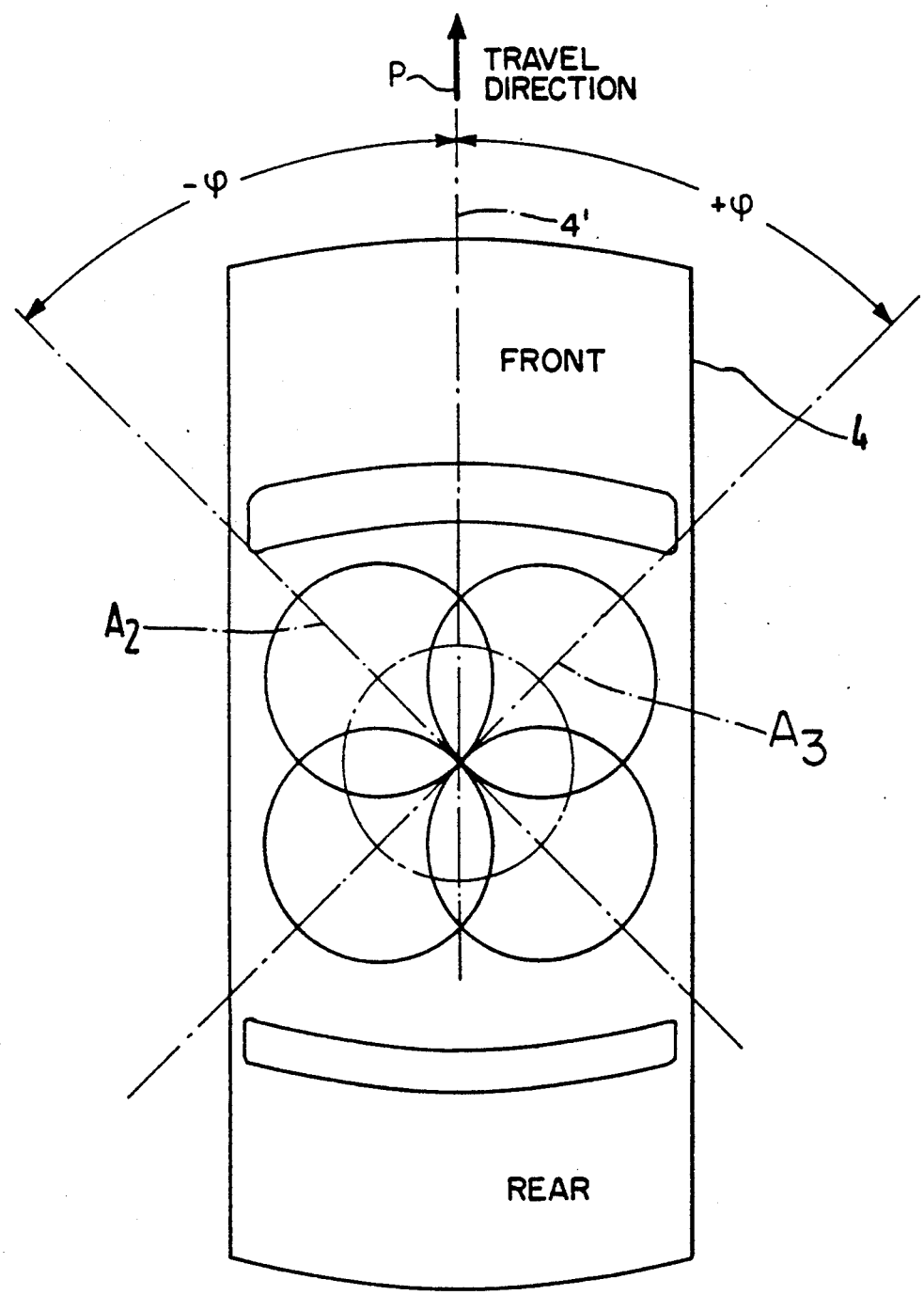

United States Patent [19]

Woehrl et al.

[11] Patent Number: 5,173,614
[45] Date of Patent: Dec. 22, 1992

[54] APPARATUS FOR TRIGGERING A PASSIVE SAFETY DEVICE

[75] Inventors: Alfons Woehrl; Peter Hora; Guenter Fendt, all of Schrobenhausen, Fed. Rep. of Germany

[73] Assignee: Messerschmitt-Boelkow-Blohm AG, Munich, Fed. Rep. of Germany

[21] Appl. No.: 352,928

[22] Filed: May 16, 1989

[30] Foreign Application Priority Data

May 16, 1988 [DE] Fed. Rep. of Germany ....... 3816587

[51] Int. Cl.⁵ .............................................. B60R 21/16
[52] U.S. Cl. .................................. 307/10.1; 180/282; 280/735
[58] Field of Search ............... 307/10.1, 121; 280/734, 280/735; 180/274, 282; 340/436, 438, 459, 669; 73/514

[56] References Cited

U.S. PATENT DOCUMENTS

| | | | |
|---|---|---|---|
| 3,762,495 | 10/1973 | Usui et al. | 280/735 X |
| 4,117,730 | 10/1978 | Spies et al. | 73/517 R |
| 4,381,829 | 5/1983 | Montaron | 180/274 |
| 4,497,025 | 1/1985 | Hannoyer | 364/424 |
| 4,620,721 | 11/1986 | Scholz et al. | 280/735 |
| 4,641,041 | 2/1987 | Mattes et al. | 307/10.1 |
| 4,836,024 | 6/1989 | Woehrl et al. | 73/514 |

FOREIGN PATENT DOCUMENTS 3717427 12/1988 Fed. Rep. of Germany .
2920147 12/1989 Fed. Rep. of Germany ...... 280/735

Primary Examiner—A. D. Pellinen
Assistant Examiner—David Osborn
Attorney, Agent, or Firm—W. G. Fasse; D. H. Kane, Jr.

[57] ABSTRACT

A crash sensor is constructed for triggering a passive safety device, such as an air bag or a seat belt tightening device. The crash sensor is capable to distinguish between different types of impacts such as front impacts, rear impacts, side impacts, and minor impacts, for example occurring in a repair shop. For example, the air bag shall be deployed only in response to a frontal impact. The crash sensor has at leasst two acceleration sensors having sensitivity axes arranged at different angles relative to the longitudinal vehicle axis or travel direction. The output signals of the acceleration sensors are integrated in respective integrated circuits and supplied to a threshold value circuit which in turn provides the necessary signal for activating a trigger circuit. Each signal processing channel is equipped with at least two parallel threshold value switches which cooperate with signal validating or signal recognizing circuits to distinguish between different impacts for permitting the deployment or for preventing the deployment of the safety device. The trigger circuit itself is also a logic circuit in which the individual inputs are received through input conductors carrying signals representing the various criteria for the deployment or prevention of the deployment of the safety device. Thus, the safety device is deployed only if a frontal impact has been recognized.

18 Claims, 4 Drawing Sheets

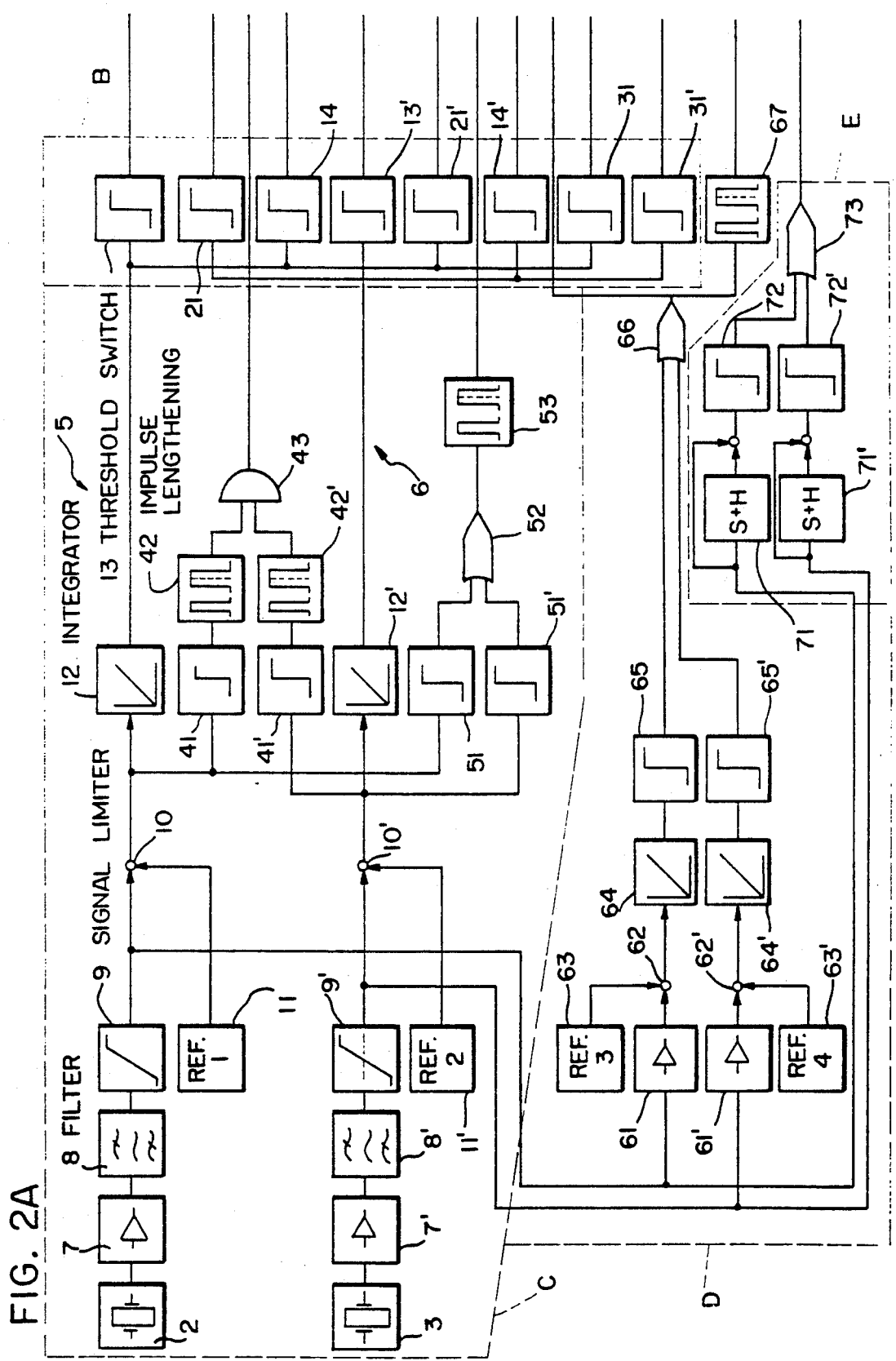

APPARATUS FOR TRIGGERING A PASSIVE SAFETY DEVICE

FIELD OF THE INVENTION

The invention relates to an apparatus for triggering a passive safety device. Such devices are used, for example, in a motor vehicle for releasing and inflating an air safety bag in response to an accidental impact.

BACKGROUND INFORMATION

German Patent Publication (DE-OS) 3,717,427, corresponding to U.S. Ser. No.: 07/196,328, now U.S. Pat. No. 4,836,024, discloses an impact sensor for motor vehicles or the like. The earlier device includes two acceleration sensors, each cooperating with two acceleration signal evaluating circuits. The two evaluating circuits forming a pair have each a different threshold value which constitute first and second reference values. Both reference values must be reached to achieve a trigger signal. The acceleration sensors are directional sensors and are so arranged that each sensor, or rather its sensing axis is directed at a different angle relative to the movement direction of the vehicle. The outputs of two circuit groups are connected to AND gates for a signal combination and the outputs of the two AND gates are connected to an OR gate for producing the trigger signal.

The above mentioned circuit is quite satisfactory for its intended purpose, but it cannot distinguish between rear impacts and lateral impacts on the one hand and front or slanted impacts on the other hand. The known circuit provides a trigger signal in response to a frontal or frontally slanted impact because only in that instance the two lower threshold values are also exceeded in both circuit groups, or rather channels. On the other hand, when a rear impact or lateral impact is involved, the lower threshold values or at least one lower threshold value in one channel is not exceeded so that in that instance the safety device is not triggered. Thus, the ability of the known impact sensor to distinguish between different types of impacts is limited. However, the known sensor is quite adaptable to different structural requirements of different types of vehicles, especially with regard to the collapsible or so-called crumple zone of a vehicle.

OBJECTS OF THE INVENTION

In view of the foregoing it is the aim of the invention to achieve the following objects singly or in combination:

to construct an impact sensor of the above type in such a way that it can reliably distinguish between different types of impacts including frontal impacts, lateral impacts, angular impacts, and rear impacts, as well as relatively small impacts, such as a hammer blow in a repair shop;

to provide an impact sensor which can be adapted to different travelling conditions of the vehicle in which the sensor is installed;

to make sure that in those situations in which the safety device must be triggered, such triggering takes place as quickly as possible, or rather at the earliest possible moment; and to provide a sensor which is also easily adaptable to different types of vehicles.

SUMMARY OF THE INVENTION

The apparatus according to the invention for triggering a passive safety device comprises in combination a plurality of individual acceleration sensors including at least a first sensor (2) and a second sensor (3) independent of said first sensor (2). Said first and second sensors feeding their individual measured signals into respective signal processing channels including signal evaluating circuits which determine the signal polarity, the signal size, and the signal direction by which is meant the direction of impact relative to a travel direction of a vehicle. The signal evaluating circuits include threshold value circuits for selecting signals or measured values which exceed a selectable threshold limitation for further processing of selected signals. Signal validating or recognizing circuits distinguish a frontal impact from a lateral impact and from a rear impact as well as from other short duration minor impacts such as a hammer blow in a repair shop. The validated or recognized signals are then further processed in a trigger signal generating circuit which triggers or activates the safety device when it is assured that a frontal impact has occurred. Thus, rear impacts do not cause the deployment of an air safety bag, for example.

Thus, according to the invention an improved logic circuit arrangement evaluates the output signals of the individual signal channels with regard to a plurality of criteria. A plurality of threshold value switches having different threshold values are provided in each threshold value circuit, whereby these different threshold values are so selected that a triggering of the safety device is possible for different travelling situations in which the respective vehicle may be. A signal evaluating or recognizing logic circuit determines which of the threshold value switches actually will cause the triggering of the safety device. These signal evaluating logic circuits evaluate the signals in all channels and produce, as a result of the signal evaluation, either a blocking signal or a release signal. These blocking or release signals then either provide an effective signal path for the generation of a trigger signal or they block or interrupt such a signal path.

An effective practical embodiment is achieved by means of two signal channels each comprising its own individual acceleration sensor, whereby the sensing or sensitivity axes of these acceleration sensors are oriented in a horizontal plane relative to the vehicle longitudinal axis at equal, but opposite lateral angles.

Each evaluating circuit in the individual signal channels comprises preferably a single or double effective integrating circuit and preferably two threshold value switches, whereby one threshold value is selected to be relatively low and the other threshold value is selected to be relatively high. A threshold value selection or validating circuit then determines which of the two threshold values is to be effective for the generation of the triggering signal for the safety device. The threshold value selection or validating circuit receives the integrated signals from the individual channels and/or the output signals of the acceleration sensors directly. However, the signals may also first pass through a signal smoothing and signal shaping operation, or rather through respective circuits. This signal selection or validating makes possible a definite recognition whether the output signals of the acceleration sensors represent a frontal impact or whether they have been caused by other circumstances. Such other circumstances may, for example, involve the travelling of the vehicle over an exceptionally bad road so that potholes cause the generation of respective impact signals. Similarly, the driving of the vehicle over a sidewalk edge or the like may cause signals that are not supposed to trigger the safety device. Other situations may cause signals that are not supposed to trigger the safety device, for example, when a hammer blow is applied in a repair shop. The signal selection or signal validating performed according to the invention makes sure that the signals that are not generated by an accident impact do not cause the triggering of the safety device to avoid its deployment.

The signal selection or signal validating circuit comprises, for example, AND-gates for combining signals including threshold value switches for comparing the output signals of the acceleration sensors independently of one another with a relatively low threshold value. Similarly, the output signals of the acceleration sensors may be compared in an OR-gate signal combining circuit cooperating with a threshold value circuit that has a relatively high threshold value against which the output signals of the acceleration sensor are compared. AND-gates and/or OR-gates may be combined in the overall circuit. If one of the comparing procedures results in an output signal at the output of the logic signal combining gates, then, for example, those inputs in the logic circuit are made ready which cooperate with the threshold value switches having the low threshold value in the individual signal channels.

In order to achieve an unambiguous definition of the beginning of an impact it is preferable that the already integrated signals of the individual signal channels are supplied independently of one another to a threshold value circuit having connected to its output an impulse lengthening or delay circuit. The outputs of the impulse lengthening or delay circuits are connected with a comparing and timing circuit which is effective for a determined time following the beginning of an impact to make ready the inputs of the logic circuits which are arranged for cooperation with the threshold value switches having the lower threshold value. When the respective time delay has ended, the comparing and timing circuits block the respective logic circuit again so that only the output signals of the threshold value circuits having the higher threshold value are taken into account, whereby the above mentioned signals that are not supposed to trigger the safety device are excluded or disabled for such triggering.

The output signals of the acceleration sensors may also be used for definitely recognizing a rear impact and to distinguish it, for example from a relatively minor impact such as a hammer blow. In a case of a rear impact, the signals from the acceleration sensor are first passed through a signal inverter and then through a respective integrating circuit. The output signals of these integrating circuits are combined in a common OR-gate which provides an output signal for blocking the power switch that would normally release the safety device. Thus, in case of a rear impact, the safety device, such as an air bag is not triggered and hence not deployed.

In a case where relatively small impacts occur, the outputs of each of the acceleration sensors are read out or scanned at short time intervals, whereby the respective instantaneous values at the end of such a short time interval are compared with the minimum value that occurred in this time interval. If this comparing yields a rather high difference value, a timing circuit checks whether these high differences are occurring within a determined time interval. If these differences occur in the determined time interval, it is possible to conclude that the signals are generated by a mechanical loading of the acceleration sensor rather than by an impact. Such mechanical loading can be hammer blows or the like. In that case, the power switch for triggering the safety device is also blocked so that repair work in the shop, for example, will not result in the inflation of the safety air bag.

It is an advantage of the invention that the threshold value which is intended to cause a triggering of the safety device can be selected in such a way that the triggering of the safety device in response to an accidental impact will take place in the shortest possible time, that is at the earliest possible moment while simultaneously making sure that other situations mentioned above will not result in the triggering of the safety device. This type of signal evaluation and recognition in combination with the available adjustability of the threshold values makes the present system very adaptable for use in different types of vehicles and also adaptable to different types of travel situations, for example, for taking into account the prevailing road conditions, and to also distinguish between different types of impacts in an optimal manner.

BRIEF FIGURE DESCRIPTION

Figure 2B:
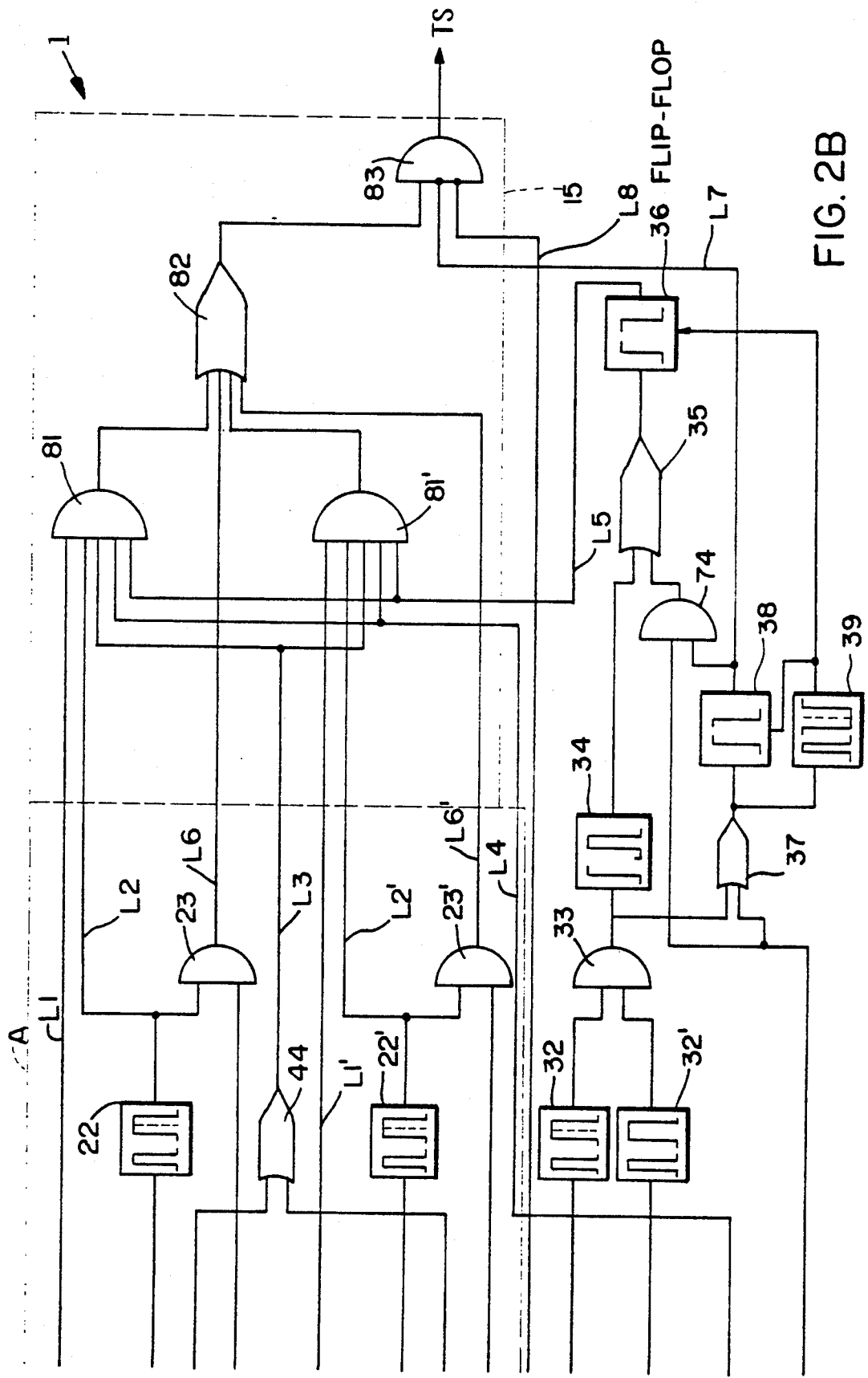
Figure 3:
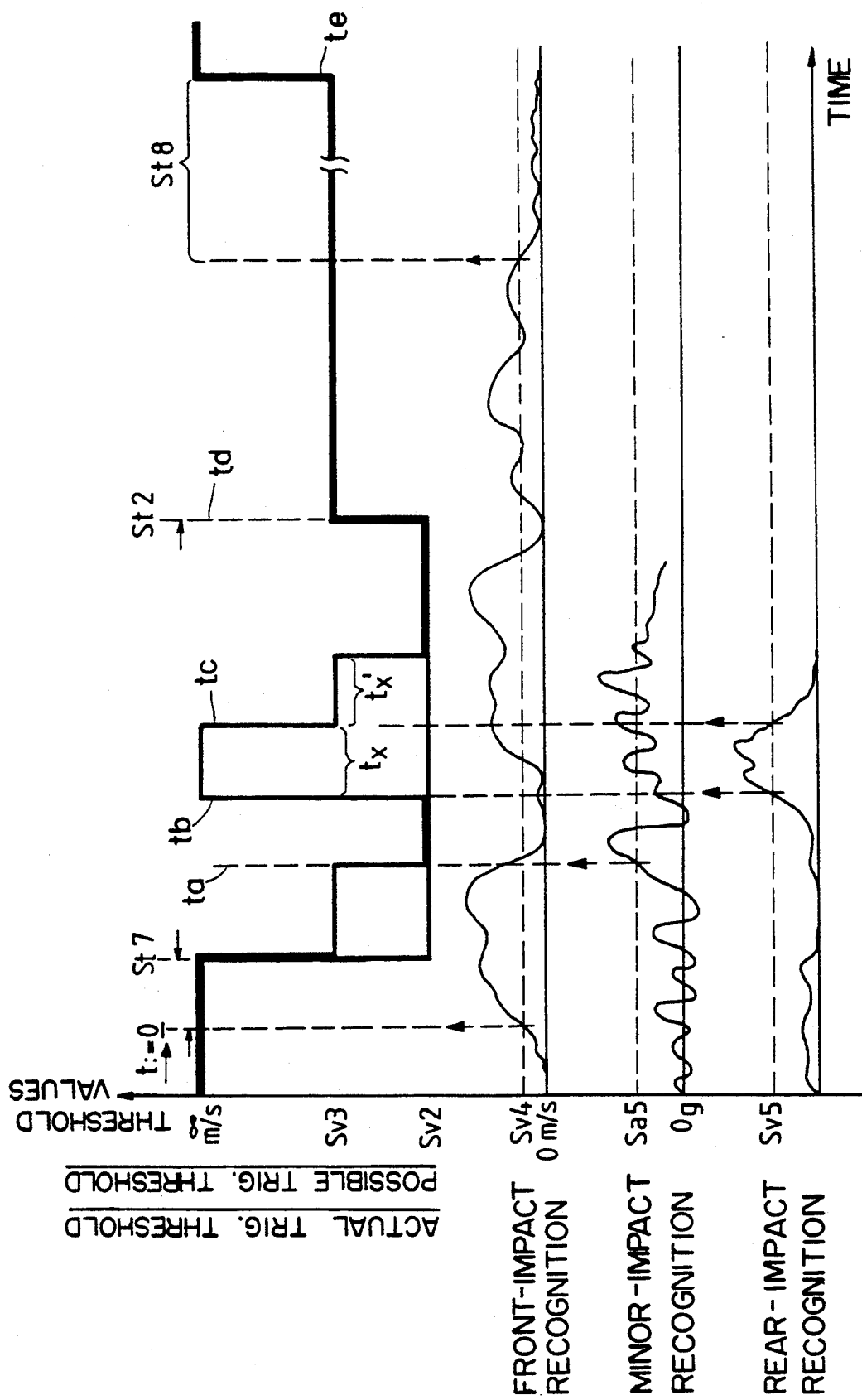

In order that the invention may be clearly understood, it will now be described, by way of example, with reference to the accompanying drawings, wherein:

FIG. 1 is a schematic top plan view of a passenger vehicle with two acceleration sensors installed in the vehicle, whereby each acceleration sensor has its sensing axis oriented at an angle to the forward travelling direction of the vehicle;

FIGS. 2A and 2B show a block circuit diagram of the present system for triggering a passive safety device, whereby two acceleration sensors oriented as shown in FIG. 1 provide the input signals for the signal processing circuit of FIGS. 2A and 2B; and FIG. 3 shows a pulse diagram illustrating several wave forms as they occur in the circuit according to FIG. 2 which processes these signals for the present purposes.

DETAILED DESCRIPTION OF A PREFERRED EXAMPLE EMBODIMENT AND OF THE BEST MODE OF THE INVENTION

The impact sensor system 1 according to the invention comprises two individual, directional impact sensors 2 and 3 of conventional construction. The acceleration impact sensor 2 has a sensing axis A2 oriented at a slanting or lateral angle $-\rho$ relative to the forward driving direction P. The individual sensor 3 has a sensing axis A3 oriented at a slanting or lateral angle $+\rho$ relative to the forward travel direction P as shown in FIG. 1. The individual acceleration impact travel direction is shown to coincide with the central longitudinal axis 4' of the vehicle 4 as shown in FIG. 1. The safety devices to be triggered, such as an air bag or a seat belt tightening mechanism are not shown, since they are conventional. The acceleration sensors 2 and 3 may, for example, be of the piezoelectric kind having the above mentioned directional sensitivity. In the shown example of FIG. 1 the angles $-\rho$ and $+\rho$ are each 45°. The sensitivity lobe of each sensor 2 and 3 corresponds to a cosine characteristic which is symmetrical relative to the sensitivity axis A2 and A3 respectively. The four circles shown in FIG. 1 are intended to represent this cosine characteristic.

The output signal of both acceleration sensors 2 and 3 are evaluated in the two signal channels 5 and 6 which are of identical construction. Therefore, it is sufficient to describe one of the channels, namely channel 5. The output signal of the acceleration sensor 2 is amplified in an amplifier 7 and supplied to a filter 8 which also shapes the wave form of the signal. The output of the filter 8 is connected to a non-symmetric signal limiter 9 which limits the signal above a positive amplitude Sa1 and below a negative amplitude Sa2. The so processed acceleration representing signal is supplied to a summing or difference forming circuit 10 which deducts a reference value Sa3 from the acceleration signal. The first reference signal Sa3 is supplied by a first reference signal circuit 11. The output signal of the summing or difference forming circuit 10 is supplied to an integrator 12 which integrates the received acceleration signals. The output of the integrator 12 is a signal representing a velocity which is supplied to a threshold value circuit comprising two parallel threshold value switches 13 and 14, one being responsive to a relatively low threshold value Sv2, the other being responsive to a higher threshold value Sv3. Both threshold values are selected in such a way that if both threshold values are exceeded by the integrated output signal from the integrator 12, a triggering of the safety device becomes possible, provided that certain further conditions are satisfied. A signal recognition or validating circuit to be described in more detail below determines which of the two threshold values shall be instantaneously effective or whether the triggering of the safety device shall be blocked or prevented. The output of the threshold value switch 13 is connected through a conductor L1 to one input of an AND-gate 81 forming part of a trigger circuit 15. The trigger circuit 15 comprises a plurality of logic circuit components to be described in more detail below. The output signal of the threshold value switch 14 is supplied to one input of an AND-gate 23 forming part of the signal validating or recognizing circuit to be described below. The corresponding circuit components of the second signal channel 6 which receive the output signal from the acceleration sensor 3 are provided with the same reference numbers, except that the respective reference numbers are provided with a prime, e.g. 11' for the second reference signal circuit.

The above mentioned signal processing channels comprise several circuit groups, namely a frontal impact recognition circuit A, a threshold value selection circuit B, an acceleration value or acceleration signal comparing circuit C, a rear end impact recognizing circuit D, and a minor impact recognizing circuit E. The sequence of the description of these circuits is not intended to have any significance.

THE FRONTAL IMPACT RECOGNIZING CIRCUIT A

This frontal impact signal recognizing circuit A shall make sure that the safety device is triggered only if in both channels 5 and 6 signals are present which are sufficiently significant to permit making a conclusion that a frontal impact or a slanted impact is involved. For this purpose, it is necessary to combine the signals of both channels 5 and 6 with each other. Thus, the output of the integrator 12' is connected to a third threshold value switch 21 having a threshold value Sv1, whereby this third threshold value Sv1 is smaller than the lowest threshold value that is necessary for triggering the safety device. Stated differently, the threshold value Sv1 is smaller than the threshold value Sv2. This third threshold value switch 21 is connected with its output to an impulse duration lengthening circuit 22 which lengthens the output of the threshold value switch 21 so that it lasts for a duration of St1. The output of the impulse lengthening circuit 22 is connected through an input conduit L2 to a further input of the AND-gate 81. Additionally, the output of the lengthening circuit 22 is connected to one input of the AND-gate 23, the other input of which is connected to the output of the second threshold value switch 14. The output of the AND-gate 23 is connected through a conductor L6 to one input of an OR-gate 82 also forming part of the trigger circuit 15.

The signal channel 5 is interconnected with the signal channel 6 in a similar manner so that the integrating circuit 12 of the first signal channel 5 is connected with a further threshold value switch 21' also having the threshold value Sv1 and the same arrangement comprising an impulse duration lengthening circuit 22' and an AND-gate 23'. The conductors L2' and L6' correspond to the above described conductors L2 and L6 leading to the AND-gate 81' and to the OR-gate 82 respectively in the trigger circuit 15.

THE THRESHOLD VALUE SELECTION CIRCUIT B

The threshold selection value circuit B determines the beginning of an impact of the vehicle and additionally, it selects the respective threshold value. For this purpose the outputs of the integrating circuits 12 and 12' are also respectively connected to threshold value switches 31 or 31' which each are responsive to or have a threshold value Sv4. This threshold value S'v4 is selected to be between the threshold values Sv1 and Sv2. Stated differently, the threshold value Sv4 also is lower than the threshold value Sv2 which is the lowest threshold value suitable for the triggering of the safety device. Both threshold value switches 31 and 31' are connected with their outputs to a respective impulse duration lengthening circuit 32 or 32'. These lengthening circuits 32, 32' lengthen the impulses that are provided by the threshold value switches, by a determined length of time St3. The outputs of these impulse duration lengthening circuits 32, 32' are connected to the respective inputs of an AND-gate 33. The output of the AND-gate 33 is connected to a time element 34 which delivers at its output a signal with a time delay of St2 following the receipt of a signal at its input. The output of the time element 34 is connected with the input of an OR-gate 35 which is further connected with its second input to an AND-gate 35'. The output of the OR-gate 35 is connected to an input of a flip-flop circuit 36 which is resettable. The output of the flip-flop circuit 36 is connected through a conductor L5 to one input of the AND-gate 81' and to an input of the AND-gate 81 forming part of the trigger circuit 15.

The output of the AND-gate 33 is further supplied to an input of an OR-gate 37, the output of which is connected to two time elements 38 and 39. The output signal of the time element 38 is a "high" or "one" signal when it does not receive an input signal. However, upon receipt of an input signal the time element 38 will provide at its output a "low" or "zero" signal after a very short time delay St7 following its receipt of an input signal. The output signals of these time elements 38, 39, are supplied through an input conductor L7 to a further AND-gate 83 forming part of the trigger circuit 15. The second time element 39 serves for resetting the first time element 38 and the flip-flop circuit 36. The second time element 39 provides at its output after a relatively long time duration following its receipt of an input signal, a reset signal to the time element 38 and to the flip-flop 36, thereby returning these components 38 and 36 to their starting condition. This reset time delay is longer than the entire duration of the function of the safety device following an impact.

THE ACCELERATION VALUE OR SIGNAL COMPARING CIRCUIT C

The signal comparing circuits C reliably recognize an impact on the basis of output signals of the acceleration sensors 2 and 3 for distinguishing an impact situation from other situations. When an impact has been recognized these circuits also cause the selection of the respective threshold values Sv2 or Sv3.

The outputs of the difference forming or summing circuits 10, 10' are also connected to two pairs of threshold switches 41 and 51 and 41' and 51', whereby the respective threshold values are Sa4 and Sa5. These threshold values are so selected that practically these threshold values can be exceeded and reached only in response to an impact. The outputs of the two threshold value switches 41 and 41' are connected with inputs of two impulse duration lengthening circuits 42 and 42' respectively. The outputs of these lengthening circuits are connected to the inputs of an AND-gate 43 the output of which is in turn connected to an OR-gate 44. The outputs of the two threshold value circuits 51 and 51' are connected to the inputs of an OR-gate 52, the output of which is connected to an impulse lengthening circuit 53 which in turn is connected with its output to the other input of the OR-gate 44. The impulse lengthening circuit 53 lengthens the signal from the output of the OR-gate 52 to a duration of St5. This duration is the same as the duration caused by the impulse lengthening circuits 42, 42' However, it is not critical that this condition be met. It is merely convenient with regard to the circuit configurations of the lengthening circuits 42, 42', and 53. The output of the OR-gate 44 is connected through the conductor L3 to an input of each of the AND-gates 81 and 81'.

THE REAR IMPACT RECOGNITION CIRCUIT D

The rear impact recognition circuit D is intended to prevent the activation of the safety device in response to a rear impact. For this purpose the outputs of the non-symmetric signal limiting circuits 9 and 9' are connected to respective signal inverting amplifiers 61, 61' so that in case of a rear end impact the generated negative acceleration output signals of the sensors 2 and 3 are converted into corresponding positive signals. The outputs of the inverting amplifiers 61, 61' are connected to respective summing circuits 62, 62' which form a difference signal with respect to corresponding reference signals Rf3 and Rf4 provided by the reference signal circuits 63 and 63' respectively. Thus, a value is deducted from the output signals of the amplifiers 61, 61' which corresponds to the threshold value Sa3. However, the reference values of the circuits 63 and 63' do not have to be the same as the reference values of the circuits 11, 11'. The outputs of the summing circuit 62 and 62' are supplied to respective integrating circuits 64 and 64' respectively. The outputs of these integrating circuits are supplied to respective threshold value switches 65 and 65' having threshold values Sv5. Thus, the signals for recognizing a rear impact are processed substantially in the same manner as in the signal channels 5 and 6. The output signal of the OR-gate 66 is supplied through a conductor L8 to one input of the AND-gate 83 in the trigger circuit 15. The output signal of the OR-gate 66 is also supplied to a signal lengthening circuit 67 which doubles the duration of the incoming impulse, but which supplies in response to an impact an output signal of at least a minimal required time duration. The output of the impulse doubling circuit 67 is connected through a conductor L4 to one input of each of the AND-gates 81 and 81' in the trigger circuit 15.

THE MINOR IMPACT RECOGNITION CIRCUIT E

The minor impact recognition circuit E makes sure that short duration relatively small mechanical loads which may cause an acceleration signal to be produced by the sensors 2 and 3, for example, in response to a hammer blow in a work shop, will not cause a triggering of the safety device. For this purpose the outputs of the non-symmetric signal limiting circuits 9 and 9' are also connected with the inputs of a respective sample and hold circuit 71, 71'. The sample and hold circuits operate within a short time duration St9, whereby the end value reached at the end of this time duration is compared with the preceding minimum value reached within the same time duration. The output signals of the sample and hold circuit 71, 71' are supplied to respective threshold value switches 72, 72'. The outputs of which are in turn connected to an OR-gate 73. The output of the OR-gate 73 is connected on the one hand to a further OR-gate 37 and on the other hand to one input of an AND-gate 74. The other input of the AND-gate 74 receives the output signal of the time element 38. The output of the AND-gate 74 is connected to one input, or rather to the second input of the OR-gate 35.

The above mentioned trigger circuit 15 for producing a trigger signal TS comprises the above repeatedly mentioned AND-gates 81 and 81', as well as an OR-gate 82 and a further AND-gate 83. The OR-gate 82 has four inputs to receive the output signals of the AND-gates 81 and 81' and of the AND-gates 23 and 23'. The five inputs of the AND-gate 81 are connected to the input conductors L1, L2, L3, L4, and L5. The five inputs of the second AND-gate 81' are connected to the input conductors L1', L2', L3, L4, and L5. One input of the AND-gate 83 is connected to the output of the OR-gate 82 while the remaining two inputs of the AND-gate 83 are connected to the above mentioned input conductors L7 and L8. The AND-gate 83 also inverts the signals on the input conductors L7 and L8 as indicated by the dots at the respective inputs of the AND-gate 83.

The circuit arrangement according to the invention operates as follows: Let it be assumed that the acceleration sensor 2 provides a non-symmetrical signal having a distinct polarity to determine a direction of impact, and which exceeds the first reference value Sa3 from 11 providing said reference value. The resulting signal at 10 will be integrated in the integrating circuit 12. If now the integrated signal exceeds the threshold Sv2 at 13 (or 13'), then the output of the AND-gate 81 will provide a "high"-signal. The AND-gate 81, however, switches only for passing the signal on to the OR-gate 82 if additionally the required signals appear at its other four inputs. Thus, the trigger signal TS will appear at the output of the AND-gate 83 only if, in addition to the five signals at the input of the AND-gate 81 there is a signal at each of the three inputs of the AND-gate 83. Of the just mentioned three signals, the signals on the input conductors L7 and L8 must each be a "low" signal. The input conductor L2 provides a "high" signal only during the time duration St1 following the application of an input signal to the impulse lengthening circuit 22. Stated differently, the just mentioned "high" signal will appear only when the signals integrated in the signal channels 5 and 6 reach the low threshold Sv1 at 21 (or 21') which in turn happens only if both acceleration sensors 2 and 3 sense a sufficiently significant signal. If the threshold value Sv1 at 21 (or 21') is reached in only one of the channels 5 or 6, the AND-gate 81 cannot provide an output signal. This is, for example, the case when a lateral impact is involved, which is to be discriminated, since it is not as dangerous as a frontal impact.

The AND-gate 81 can provide an output signal only when the signal on the input conductor L3 is a "high" signal. This requirement means that at least one of the two acceleration validating or recognizing circuits must provide an output signal. Stated differently, at least the lower acceleration threshold value Sa4 at 41 (or 41') must be reached in both channels or the higher acceleration threshold value Sa5 at 51 (or 51') must at least be reached in one of the channels 5 or 6.

The fourth input conductor L4 to the AND-gate 81 provides a "high" signal only if the rear impact recognizing circuit did not detect a rear impact. In other words, the conductor L4 provides the "high" signal only when no signal is present at the input of the inverting, impulse length doubling circuit 67. The input signal to the circuit 67 is also present on the conductor L8 so that the respective "low" signal releases the third input of the AND-gate 83. If a rear impact is detected, the output signal of the inverting impulse length doubling circuit 67 would be a "low" signal so that the AND-gate 81 will not release a signal at its output. Similarly, in this situation, the "high" signal at the output of the OR-gate 66 would, due to the inverting, block the AND-gate 83.

Further, the input conductor L5 must also provide a "high" signal for enabling the AND-gate 81 to provide a signal at its output. The flip-flop 36 provides the "high" signal on the conductor L5 in response to an impact during the time duration St2 as determined by the time element 34. This condition, however, requires in turn that in both signal channels 5 and 6 the integrated signals reach the threshold value Sv4 at 31 (or 31'), which means that in both channels sufficiently significant signals must be present for triggering the AND-gate 81 as mentioned above. Additionally, the signal on the input conductor L7 to the AND-gate 83 must be a "low" signal. This condition is satisfied if, after the beginning of an impact the time duration St7 at 38 has passed which is detected by the AND-gate 33 which provides a respective output signal. During this time duration St7, the output signal of the impulse duration lengthening circuit 38, which is normally a "low" signal is switched to the "high" signal at L7 thereby blocking the AND-gate 83 for the duration St7. This blocking function is achieved, for example, if only a short duration minor impact such as a hammer blow, is detected. Only if all the above mentioned conditions are satisfied on conductors L1 or L5, will the AND-gate 81 be triggered to provide a respective output signal which in turn will provide the trigger signal TS at the output of the trigger circuit 15 for triggering the safety device.

After the time duration St2 has passed, as determined by the time element 34, the flip-flop 36 blocks the AND-gate 81 through the input conductor L5 which now carries the "low" signal. In this instance, the safety device can be triggered or deployed only if the conductor L6 provides a "high" signal to the respective input of the OR-gate 82, and additionally the two input conductors L7 and L8 provide a "low" signal to the respective input of the AND-gate 83. A "high" signal occurs, however, only on the input conductor L6 if the two inputs to the AND-gates 23 also carry a "high" signal, namely, if the integrated output signal of the integrator 12 exceeds the threshold value Sv3 of the threshold value switch 14 and simultaneously, the signal integrated by the integrator 12' exceeds the low threshold value Sv1 at 21 (or 21') during the time duration St1 as determined by the impulse lengthening circuit 22 (or 22'). Stated differently, even in this case it is necessary that both signal processing channels 5 and 6 carry sufficiently significant signals.

The AND-gate 81 can also be blocked during the time duration St2 determined by the impulse lengthing circuit 34 so that the triggering of the safety device can take place only through the OR-gate 82 and the AND-gate 83 for discriminating minor impacts. The AND-gate 81 is blocked by the "low" signal on the input conductor L2. The blocking can also take place if, in the acceleration validating or recognizing circuits no relevant output signal is present either at the output of the AND-gate 43 or at the output of the impulse lengthening circuit 53.

The above considerations applicable to the switching of the AND-gate 81 apply equally to the second AND-gate 81' since the signals on the input conductors L1' and L2' are produced in the similar manner as the signals on the input conductors L1 and L2 and the other conductors L3, L4, and L5 are the same for both AND-gates 81 and 81'.

With the circuit arrangement described above, it is possible to recognize and validate a plurality of output signals from the acceleration sensors 2 and 3 to thereby distinguish between different types of impacts and to respectively cause a triggering of the safety device or to prevent a triggering of the safety device.

FIG. 3 shows an illustration of the possible threshold value switches or selections. The upper row illustrates the two threshold values Sv2 and Sv3 suitable for triggering the passive safety device. After integration of the sensed acceleration values the threshold values are indicated with the dimension meter per second. The symbol ∞ indicates the threshold value in which the entire system is blocked. This system blocking is always present during normal operation because the AND-gates 81 and 81', the OR-gate 82 and the AND-gate 83 are normally blocked against passing signals. FIG. 3 further shows the recognition of a front impact impulse train, a minor impact impulse train, and a rear impact impulse train. The threshold values are shown as a function of time.

At the time zero an impact is detected by the AND-gate 33 because the integrated output signals of the signal channels 5 and 6 exceed the threshold given by the threshold value switches 30 and 31', namely the threshold value Sv4. The second row down in the signal diagram of FIG. 3 merely shows the integrated output signal of one of the signal channels 5 or 6. The impact sensor 1 remains blocked for the short time duration St7 as determined by the time element 38 following the detection of the beginning of an impact at t=0. This is so because during this time period St7 the input conductor L7 carries a "high" signal which blocks the AND-gate 83. Only after this time period the threshold value Sv2 and Sv3 become effective depending on the above indicated criteria. It is assumed that the threshold value Sv3 shall become effective.

At another point of time ta the high threshold value SA5 is exceeded in one of the channels 5 or 6. This is shown in the minor impact recognition pattern in FIG. 3. As a result, the effective threshold value Sv2 is adjusted. If thereafter at time tb a rear impact is detected, that is the threshold value Sv5 is exceeded in one of the channels of the rear impact recognition circuit, the threshold value is again raised to an infinite value following the time tb. Stated differently, the entire sensor is blocked again for the duration tx. The duration tx corresponds to the length of the output impulse provided by the OR-gate 66. Thereafter, at time tc the threshold value is lowered again from ∞ to the threshold value Sv3 (larger value) as the output signal of the impulse length doubling circuit 67 blocks the two AND-gates 81 and 81' in the trigger circuit 15. This state continues for the time duration tx' as shown in FIG. 3.

When the time duration St2 as determined by the time element 34 has run out, then the impact sensor is switched again so that the higher threshold value Sv3 becomes effective again at td. If the integrated output signal from the channels 5 and 6 falls below the threshold value Sv4 at the time te following a time duration St8, the entire sensor system is reset into the starting state by the inverted output signal of the time element 39.

It should be mentioned that the heavy line representing the threshold values in FIG. 3 is not intended to represent any particular threshold value combination. Rather, FIG. 3 is intended to illustrate the switchability or selectability among the individual threshold values. A large number of combinations of threshold values is possible. Further, the basic concept of the invention could be realized by other circuit combinations. It may not, for example, be necessary to use all the circuit groups illustrated in FIG. 2. The realization of the switching functions described above with reference to FIG. 2 may be accomplished, for example, with aid of a microprocessor.

Although the invention has been described with reference to specific example embodiments, it will be appreciated that it is intended to cover all modifications and equivalents within the scope of the appended claims.

What we claim is:

1. An apparatus for triggering a passive safety device in a vehicle in response to an impact, comprising at least two individual acceleration sensors (2, 3), each individual acceleration sensor having its own sensitivity axis (A2, A3) oriented differently than a respective sensitivity axis of the other individual acceleration sensor so that each sensor covers its own angular sensitivity range to discriminate between different impact directions, one signal evaluating and processing channel (5, 6) connected to each individual acceleration sensor (2, 3) respectively, each signal evaluating and processing channel comprising first signal recognizing circuit means (7, 8, 9) for determining the magnitude of an impact and second circuit means (10, 11, 12) for determining an impact duration, said first and second circuit means being connected to an output of the respective individual acceleration sensor (2, 3), and threshold circuit means (41, 41', 51, 51') connected to an output of a respective one of said signal recognizing circuit means, whereby each individual acceleration sensor (2, 3) is part of a respective series circuit with its own signal recognizing circuit means and with its own threshold circuit means for forming said signal evaluating and processing channels, to distinguish types of impacts from each other, and logic trigger circuit means (81, 82, 83) connected to said series circuit channels for triggering said passive safety device, each of said signal evaluating and processing channels comprising further threshold circuit means (13, 13'; 21, 21') comprising at least two threshold switches, each threshold switch having a different threshold value for enabling a triggering of said passive safety device in response to a signal exceeding the respective threshold value, said signal evaluating and processing channels further comprising means (34, 37, 74) for discriminating minor impacts and generating respective blocking signals and triggering signals (81, 82, 83) for the operation of said passive safety device (15) in response to signals from said signal evaluating and processing channels, said trigger circuit means comprising logic circuit means having first inputs connected to all threshold switches and further inputs connected to each signal recognizing circuit means, said logic circuit means having AND-gates and OR-gates interconnected to provide a circuit characteristic that passes signals only from certain threshold switches in response to said blocking signals and said triggering signals for triggering said passive safety device in response to one impact signal while suppressing other impact signals to avoid such triggering of said safety device in response to said other impact signals.

2. The apparatus of claim 1, wherein each of said signal evaluating and processing channels comprises frontal impact recognizing circuit means connected to evaluating circuits of both channels, said frontal impact recognizing circuit comprising a further threshold value switch (21) having a low threshold value (Sv1), and wherein said further threshold value switches are connected with their inputs to the evaluating circuit means of the respective other channel.

3. The apparatus of claim 2, further comprising impulse duration lengthening circuit means (22, 22') connected to outputs of the respective further threshold value switch.

4. The apparatus of claim 2, further comprising an AND-gate (81, 81'), and wherein the output of each frontal impact recognizing circuit (21, 22, 21', 22') is connected to an input of the respective AND-gate to which also outputs of said threshold value switches (13, 13') are connected, whereby these threshold value switches represent the low threshold value (Sv2) that could enable a triggering of the safety device.

5. The apparatus of claim 1, wherein said threshold circuit means comprise threshold value selecting circuit means connected to all signal channels, wherein at least a portion of said threshold value switches are interconnected through an AND-gate (33), said channels further comprising a time delay element (34) connected to an output of said AND-gate (33), said time delay element (34) having an output (L5) connected through respective circuit means (35, 36) to said trigger circuit means (15) for selecting of determined threshold values (Sv2, Sv3) which are capable of enabling said trigger circuit means.

6. The apparatus of claim 5, comprising a further time delay element (38) connected for a delayed triggering of said safety device after the beginning of a frontal impact of the vehicle.

7. The apparatus of claim 1, wherein said channels comprise acceleration evaluating circuit means (41, 42 41', 42', 43; 51, 51', 52, 53) for evaluating output signals of said individual acceleration sensors (2, 3), and wherein an output (44, L3) of said acceleration evaluating circuit means is connected to input means of said logic trigger circuit means (15).

8. The apparatus of claim 7, wherein said acceleration evaluating circuit means comprise at least one threshold value switch means (41, 41') in each of said channels operatively connected to the respective individual acceleration sensor (2, 3), said threshold value switch means (41, 41') being connected to inputs of an AND-gate (43) having an AND-gate output connected to said output (44, L3) of said acceleration evaluating circuit means.

9. The apparatus of claim 7, wherein said acceleration evaluating circuit means comprise at least one threshold value switch means (51, 51') in each of said channels operatively connected to the respective acceleration sensor (2, 3), said threshold value switch means being connected to an OR-gate (52) having an OR-gate output connected to said output (44, L3), and wherein a time delay circuit (53) is arranged between said OR-gate output and said output (44, L3) of said acceleration evaluating circuit means.

10. The apparatus of claim 1, further comprising rear impact recognizing circuit means including signal inverter means (61, 61') operatively connected to said individual acceleration sensor means, integrating circuit means (64, 64') connected to said signal inverter means, threshold value switch means (65, 65'), and means (66, L8) connecting said threshold value switch means to said trigger circuit means.

11. The apparatus of claim 10, wherein said connecting means for connecting said threshold value switch means (65, 65') to said trigger circuit means comprise an OR-gate (66) forming an output (L8) of said rear impact recognizing circuit.

12. The apparatus of claim 11, further comprising a signal lengthening circuit (67) also connected to the output of said OR-gate (66), and conductor means (L4) connecting said signal lengthening circuit (67) to a blocking input of said logic trigger circuit (15).

13. The apparatus of claim 1, further comprising minor impact recognizing circuit means for recognizing short duration minor mechanical impacts as sensed by said individual sensor means, comprising sample-and-hold circuit means (71, 71') connected to receive signals measured by said sensor means (2, 3), said sample-and-hold circuit means comparing, within time intervals of definite length, an instantaneous output value at the end of such a time interval with the smallest (minimum) value occurring within such time interval, and means (L5, L7) connecting outputs of said sample-and-hold circuit means to said logic trigger circuit means.

14. The apparatus of claim 1, wherein said logic trigger circuit means comprise AND-gate means (81, 81') for said channels, said AND-gate means having inputs connected to those threshold value circuit means in said channels which have a low threshold value (Sv2) capable of enabling a triggering of said logic trigger circuit (15) for activating said safety device, said AND-gate means having further input means (L2, L2', L3, L4, L5) connected to said recognizing circuit means for recognizing different types of inputs.

15. The apparatus of claim 14, wherein said logic trigger circuit means comprise OR-gate means (82) connected in common to said AND-gate means (81, 81') and to threshold value switches (14, 14') in at least certain of said channels, said certain threshold value switches (14, 14') having a higher threshold value (Sv3), than said low threshold value (Sv2), capable of enabling a triggering of said logic trigger circuit for activating said safety device.

16. The apparatus of claim 15, wherein said logic trigger circuit means comprise an AND-gate (83) forming an output of said logic trigger circuit means for connection to said safety device, said output AND-gate (83) having one input connected to an output of said OR-gate (82), and two further inputs (L7, L8) connected to signal recognizing circuit means, said OR-gate providing an activating signal, said signal recognizing circuit means providing activating or blocking signals to said output AND-gate (83), whereby said safety device can be triggered or deployed only if all required conditions are satisfied at the input of said output AND-gate (83).

17. The apparatus of claim 16, wherein said activating or blocking signals are provided by rear impact recognizing circuit means and/or by minor impact recognizing means.

18. The apparatus of claim 16, wherein said two further inputs of said AND-gate (83) are signal inverting inputs.

* * * * *